(12) United States Patent
Kani et al.

(10) Patent No.: US 9,239,091 B2
(45) Date of Patent: Jan. 19, 2016

(54) SEALING DEVICE AND SUSPENSION DEVICE WITH THE SEALING DEVICE

(71) Applicant: KAYABA INDUSTRY CO., LTD., Minato-ku, Tokyo (JP)

(72) Inventors: Kiyoshi Kani, Kani (JP); Minoru Honda, Kitanagoya (JP); Makoto Suzuki, Kani (JP); Naohide Takimoto, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/342,738

(22) PCT Filed: Oct. 17, 2012

(86) PCT No.: PCT/JP2012/076839
§ 371 (c)(1),
(2) Date: Mar. 4, 2014

(87) PCT Pub. No.: WO2013/061842
PCT Pub. Date: May 2, 2013

(65) Prior Publication Data
US 2014/0216872 A1    Aug. 7, 2014

(30) Foreign Application Priority Data

Oct. 28, 2011    (JP) .................................. 2011-236574

(51) Int. Cl.
*F16F 9/36* (2006.01)
*F16J 15/32* (2006.01)

(52) U.S. Cl.
CPC . *F16F 9/369* (2013.01); *F16F 9/36* (2013.01); *F16J 15/3204* (2013.01); *F16J 15/3232* (2013.01); *F16F 2224/0291* (2013.01); *F16F 2230/30* (2013.01)

(58) Field of Classification Search
CPC ...... F16J 15/3232; F16J 15/3204; F16F 9/36; F16F 9/368; F16F 9/369; F16F 2230/30; F16F 2224/0291; F15B 15/1461
See application file for complete search history.

(56) References Cited

U.S. PATENT DOCUMENTS 6,334,618 B1 *   1/2002   Ohta et al. .................... 277/549
6,820,729 B2 *  11/2004   Verriet .................... 188/322.17

(Continued)

FOREIGN PATENT DOCUMENTS

JP    61-93604 U1    6/1986
JP    2-20533 Y2    6/1990

(Continued)

OTHER PUBLICATIONS

International Search Report mailed Jan. 22, 2013, in corresponding International Application No. PCT/JP2012/076839.

(Continued)

*Primary Examiner* — Vishal Sahni
(74) *Attorney, Agent, or Firm* — Hauptman Ham, LLP

(57) ABSTRACT

A sealing device for sealing between a tube member and an axial member movably inserted into the tube member includes a dust seal held on an opening end part of the tube member and including an annular dust seal lip held in sliding contact with the outer peripheral surface of the axial member, and a scraper arranged at an inner side of the dust seal and including an annular lip portion slidably pressed into contact with the outer peripheral surface of the axial member. The hardness of the lip portion is set to be higher than that of the dust seal lip.

6 Claims, 2 Drawing Sheets

(56) References Cited

U.S. PATENT DOCUMENTS

| | | |
|---|---|---|
| 2004/0079602 A1 | 4/2004 | Verriet |
| 2006/0103075 A1* | 5/2006 | Zahn .............................. 277/436 |
| 2011/0169226 A1* | 7/2011 | Ajiki et al. .................... 277/562 |
| 2014/0167380 A1* | 6/2014 | Ogura et al. .................. 280/276 |

FOREIGN PATENT DOCUMENTS

| | | |
|---|---|---|
| JP | 02-144391 A | 6/1990 |
| JP | 03-00168 U1 | 1/1991 |
| JP | 04-32342 U1 | 3/1992 |
| JP | 2002-357080 A | 12/2002 |
| JP | 2010-116997 A | 5/2010 |
| WO | 2011/030576 A1 | 3/2011 |

OTHER PUBLICATIONS

Office Action issued Apr. 7, 2015, corresponding to Chinese patent application No. 201280032910.7.

Office Action issued Jun. 15, 2015, corresponding to Korean patent application No. 10-2014-7001066.

* cited by examiner

SEALING DEVICE AND SUSPENSION DEVICE WITH THE SEALING DEVICE

RELATED APPLICATIONS

The present application is a National Phase of International Application Number PCT/JP2012/076839, filed Oct. 17, 2012, which claims priority to Japanese Application Number 2011-236574, filed Oct. 28, 2011.

TECHNICAL FIELD

The present invention relates to a sealing device and a suspension device with the sealing device.

BACKGROUND ART

A sealing device is used in a shock absorber for suppressing vibration of transportation equipment or a building, a suspension device containing this shock absorber or the like and seals working fluid stored in the shock absorber or the suspension device.

For example, a suspension device called a front fork for suspending a front wheel is installed in a saddled vehicle such as a motorcycle. The suspension device includes a suspension main body with an outer tube and an inner tube inserted in such a manner as to project from and retract into the outer tube, and the shock absorber is housed in this suspension main body.

A reservoir for temperature compensation and volume compensation is formed between the suspension main body and the shock absorber and stores working fluid and gas. A sealing device used in the suspension device prevents the leakage of the working fluid and the gas in the reservoir from the suspension main body to an outer side (atmosphere side).

JP04-32342A discloses a sealing device including an annular dust seal held on an opening end part of an outer tube and held in sliding contact with the outer peripheral surface of an inner tube, and an annular oil seal held on the opening end part of the outer tube, held in sliding contact with the outer peripheral surface of the inner tube and arranged at an inner side (working-fluid side) of the dust seal.

This sealing device scrapes off foreign substances adhering to the outer peripheral surface of the inner tube by the dust seal and scrapes off the working fluid adhering to the outer peripheral surface of the inner tube by the oil seal. In this way, the sealing device can prevent the leakage of the working fluid and the gas in the suspension main body to the outer side (atmosphere side) due to scratches on sliding surfaces of the oil seal and the inner tube caused by foreign substances and maintain the interior of the suspension main body in a sealed state.

SUMMARY OF INVENTION

However, in the case of using a shock absorber and a suspension device in a motorcycle for motocross, use under a severe environment such as exposure to muddy water is considered. In this case, fine particles such as fine soil particles contained in the muddy water may possibly remain on the outer peripheral surface of the inner tube in a dry and ring state and be brought to the inner side (working-fluid side) of the dust seal. This leads to a possibility that the fine particles scratch the sliding surface of the inner tube (axial member) and the working fluid and the gas stored in the suspension main body leak to the outer side (atmosphere side) through the resulting scratches.

The present invention aims to provide a sealing device capable of scraping off foreign substances adhering to the outer peripheral surface of an axial member even under a severe use environment and a suspension device with this sealing device.

According to one aspect of the present invention, a sealing device adapted to seal between a tube member and an axial member movably inserted into the tube member is provided. The sealing device includes a dust seal held on an opening end part of the tube member and including an annular dust seal lip held in sliding contact with the outer peripheral surface of the axial member; and a scraper arranged at an inner side of the dust seal and including an annular lip portion slidably pressed into contact with the outer peripheral surface of the axial member, wherein the hardness of the lip portion is set to be higher than that of the dust seal lip.

Embodiments of the present invention and advantages thereof are described in detail below with reference to the accompanying drawings.

DESCRIPTION OF EMBODIMENTS

Hereinafter, an embodiment of the present invention is described with reference to the drawings. The same reference signs assigned through several drawings denote the same components.

Figure 1:
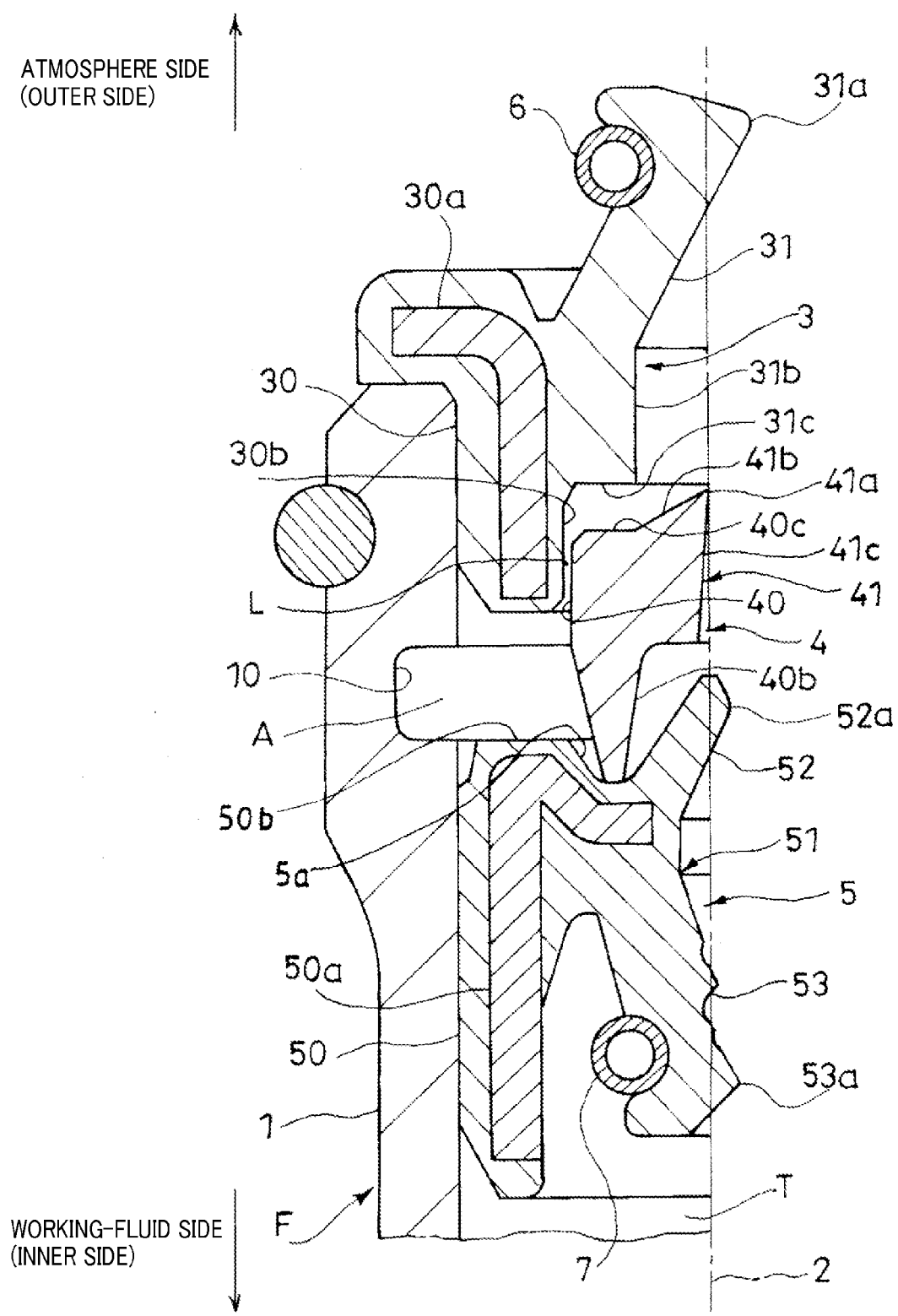
FIG. 1 is a longitudinal sectional view partially showing a used state of a sealing device according to an embodiment of the present invention.

As shown in FIG. 1, a sealing device according to the present embodiment seals between an outer tube 1 as a tube member and an inner tube 2 as an axial member movably inserted into the outer tube 1.

Figure 2:
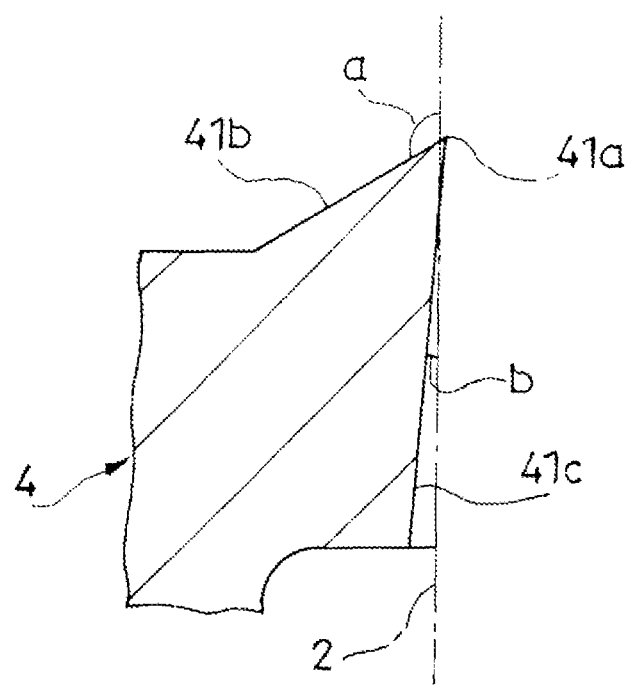
FIG. 2 is a longitudinal sectional view enlargedly showing a part of FIG. 1.

The sealing device includes a dust seal 3 held on an opening end part of the outer tube 1 and including an annular dust seal lip 31 held in sliding contact with the outer peripheral surface of the inner tube 2, and a scraper 4 arranged at an inner side (lower side in FIG. 1) of the dust seal 3 and including an annular lip portion 41 slidably pressed into contact with the outer peripheral surface of the inner tube 2. Further, the hardness of the lip portion 41 is set to be higher than that of the dust seal lip 31. It should be noted that FIGS. 1 and 2 show a sealing device in a free state not held in contact with the inner tube 2 and the outer peripheral surface of the inner tube 2 is shown by imaginary line.

The sealing device is used in a suspension device called a front fork for suspending a front wheel in a saddled vehicle such as a motorcycle. A basic configuration of the front fork is not shown in detail since being well-known. The front fork includes a telescopic suspension main body F including the outer tube 1 and the inner tube 2 inserted in such a manner as to project from and retract into the outer tube 1, and an unillustrated shock absorber housed in the suspension main body F for suppressing extension and contraction movements of the suspension main body F.

An unillustrated reservoir is formed between the interior of the suspension main body F and the shock absorber. The reservoir performs temperature compensation and volume compensation of the shock absorber by storing working fluid and gas. The working fluid is liquid such as water, glycol solution or oil and the gas is inert gas such as nitrogen. It should be noted that the configuration of the shock absorber is not described in detail since any known configuration may be adopted.

One opening of the suspension main body F located on an upper side in FIG. 1 is closed by an unillustrated cap member. The other opening of the suspension main body F located on a lower side in FIG. 1 is closed by an unillustrated bottom member. In the suspension main body F, a tubular clearance T formed in a part where the outer tube 1 and the inner tube 2 overlap in an axial direction is closed by the sealing device. This can prevent the leakage of the working fluid in the reservoir from the suspension main body F to an outer side (atmosphere side).

The sealing device further includes the dust seal 3 held on the opening end part of the outer tube 1 as the tube member, and an oil seal 5 held on the opening end part of the outer tube 1 and arranged in series at an inner side (working-fluid side) below the dust seal 3 in FIG. 1.

The dust seal 3 and the oil seal 5 are arranged with a predetermined clearance, and a space A is formed between the dust seal 3 and the oil seal 5. An annular groove 10 having a U-shaped cross-section is formed between the dust seal 3 and the oil seal 5 on the inner peripheral surface of the opening end part of the outer tube 1.

The dust seal 3 is formed by covering an insert metal 30a made of metal with NBR (nitrile rubber). The annular dust seal lip 31 made of this NBR scrapes off foreign substances adhering to the outer peripheral surface of the inner tube 2.

In the dust seal 3, a part including the insert metal 30a inside is a dust seal main body 30, and is annularly formed and fitted into the outer tube 1. The dust seal lip 31 is continuously connected to the inner periphery of an outer side (atmosphere side) of this dust seal main body 30 located on the upper side in FIG. 1.

An inner peripheral end 31a, which is a part of the dust seal lip 31 having a smallest diameter, is formed to have a diameter smaller than an outer diameter of the inner tube 2. Further, a garter spring 6 for pressing the inner peripheral end 31a of the dust seal lip 31 against the inner tube 2 is provided on the outer periphery of the dust seal lip 31.

In the dust seal 3, the inner side (working-fluid side) of the dust seal main body 30 located on the lower side in FIG. 1 is formed to project downward from a base portion 31b of the dust seal lip 31 continuously connected to the dust seal main body 30. That is, an inner side surface 31c of the base portion 31b and an inner peripheral surface 30b on the inner side of the dust seal main body 30 are arranged to form an inverted L-shaped cross-section.

Similarly to the dust seal 3, the oil seal 5 is formed by covering an insert metal 50a made of metal with NBR. The annular oil seal lip 51 made of this NBR scrapes off the working fluid adhering to the outer peripheral surface of the inner tube 2.

In the oil seal 5, a part including the insert metal 50a inside is an oil seal main body 50, and is annularly formed and fitted into the outer tube 1. The oil seal lip 51 is continuously connected to the inner periphery of an outer side (atmosphere side) of this oil seal main body 50 located on the upper side in FIG. 1.

The oil seal lip 51 is forked into upper and lower sides (atmosphere side and working-fluid side) in FIG. 1 and includes a sub lip 52 arranged on an outer side (atmosphere side) located on the upper side in FIG. 1 and a main lip 53 arranged on an inner side (working-fluid side) located on the lower side in FIG. 1. By this, the oil seal 5 scrapes off the working fluid adhering to the outer peripheral surface of the inner tube 2 by the main lip 53 and scrapes off foreign substances adhering to the outer peripheral surface of the inner tube 2 by the sub lip 52.

An inner peripheral end 52a, which is a part of the sub lip 52 having a smallest diameter, is formed to have a diameter smaller than the outer diameter of the inner tube 2. An inner peripheral end 53a, which is a part of the main lip 53 having a smallest diameter, is formed to have a diameter smaller than the outer diameter of the inner tube 2. Further, a garter spring 7 for pressing the inner peripheral end 53a of the main lip 53 against the inner tube 2 is provided on the outer periphery of the main lip 53.

In the oil seal 5, an annular groove 5a is formed on an outer side surface 50b of the oil seal main body 50 on the oil seal lip 51 side.

The sealing device further includes the annular scraper 4 arranged in series between the dust seal 3 and the oil seal 5. The scraper 4 is made of PTFE (polytetrafluoroethylene) having a higher hardness than the NBR forming the dust seal lip 31.

The scraper 4 includes an annular scraper main body 40, and an annular lip portion 41 continuously connected to the inner periphery of the scraper main body 40 and inclined toward the outer side (atmosphere side) located on the upper side in FIG. 1. In the scraper 4, an inner peripheral end 41a of the lip portion 41 has a smallest diameter and is slightly smaller than the outer diameter of the inner tube 2.

In the lip portion 41, an outer side surface 41b and an inner peripheral surface 41c intersect at an acute angle on the inner peripheral end 41a as an apex. Further, as shown in FIG. 2, an angle a formed between the outer side surface 41b of the lip portion 41 and the outer peripheral surface of the inner tube 2 is set to be larger than an angle b formed between the inner peripheral surface 41c of the lip portion 41 and the outer peripheral surface of the inner tube 2.

A stopper 40b projecting toward the inner side (working-fluid side) located on the lower side in FIG. 1 is formed with the scraper main body 40. The tip of the stopper 40b can come into contact with the groove 5a of the oil seal 5 and the stopper 40b is so arranged as not to interfere with the sub lip 52.

An outer diameter of the scraper main body 40 is smaller than an inner diameter of the dust seal main body 30. This enables the scraper 4 to move in the axial direction (vertical direction in FIG. 1), following the inner tube 2, from a position where an outer side surface 40c of the scraper main body 40 located on the upper side in FIG. 1 is in contact with the inner side surface 31c of the base portion 31b of the dust seal lip 31 to a position where the tip of the stopper 40b in the scraper main body 40 is in contact with the groove 5a of the oil seal 5.

A tubular clearance L is formed between the outer periphery of the scraper 4, i.e. the outer peripheral surface (not denoted by a reference sign) of the scarper main body 40 and the inner peripheral surface 30b of the dust seal main body 30. This enables the scraper 4 to move also in a radial direction (lateral direction in FIG. 1), following the inner tube 2. It should be noted that the clearance L communicates with the space A formed between the oil seal 5 and the dust seal 3.

Next, functions and effects of the sealing device according to the present embodiment are described.

The sealing device includes the dust seal 3 and the scraper 4 arranged at the inner side (working-fluid side) of the dust seal 3. Since the hardness of the lip portion 41 of the scraper 4 is set to be higher than that of the dust seal lip 31, foreign substances that cannot be scraped off by the dust seal lip 31 can be scraped off by the scraper 4.

Accordingly, the sealing device can reliably scrape off foreign substances adhering to the outer peripheral surface of the inner tube 2 as the axial member.

Here, if the scraper 4 is arranged at the outer side (atmosphere side) of the dust seal 3, there is a possibility that the scraper 4 is scratched by foreign substances having a large particle diameter. However, since the scraper 4 is arranged at the inner side (working-fluid side) of the dust seal 3 in the present embodiment, foreign substances having a large particle diameter can be scraped off by the dust seal 3 and the damage of the scraper 4 can be prevented.

Further, since interference is provided by setting an inner diameter of the inner peripheral end 41*a* of the lip portion 41 in the scraper 4 to be smaller than the outer diameter of the inner tube 2, the lip portion 41 is pressed into contact with the outer peripheral surface of the inner tube 2. Further, the outer periphery of the scraper 4 is not restrained and the tubular clearance L communicating with the space A is formed on the outer periphery of the scraper 4.

Thus, the scraper 4 can move following the inner tube 2, maintain a contact state between the inner tube 2 and the scraper 4, and prevent an occurrence of a gap between the inner tube 2 and the scraper 4.

Further, since being able to move between the dust seal 3 and the oil seal 5, the scraper 4 moves together with the inner tube 2 until coming into contact with the oil seal 5 when the front fork is compressed. When coming into contact with the oil seal 5, the scraper 4 scrapes off foreign substances adhering to the outer peripheral surface of the inner tube 2 while being supported on the oil seal 5. At this time, since the scraper 4 is distant from the dust seal 3, the foreign substances scraped off by the scraper 4 can be moved to the space A via the clearance L.

Further, since the annular groove 10 is formed between the dust seal 3 and the oil seal 5 on the inner peripheral surface of the opening end part of the outer tube 1, the volume of the space A can be enlarged and more foreign substances can be stored.

Further, since the stopper 40*b* is formed with the scraper main body 40 and the stopper 40*b* can come into contact with the groove 5*a* of the oil seal 5, the interference of the scraper 4 with the oil seal lip 51 can be avoided.

Further, since the outer side surface 41*b* and the inner peripheral surface 41*c* of the lip portion 41 in the scraper 4 intersect at an acute angle and the angle a formed between the outer side surface 41*b* and the outer peripheral surface of the inner tube 2 is set to be larger than the angle b formed between the inner peripheral surface 41*c* and the outer peripheral surface of the inner tube 2, foreign substances adhering to the outer peripheral surface of the inner tube 2 can be more reliably scraped off.

Further, since the scraper 4 is made of PTFE, a frictional force acting between the scraper 4 and the inner tube 2 can be reduced.

The embodiments of the present invention described above are merely illustration of some application examples of the present invention and not of the nature to limit the technical scope of the present invention to the specific constructions of the above embodiments.

For example, although the sealing device is described to be used in the front fork for motorcycle in the above embodiment, the above sealing device may be used in another suspension device, a shock absorber or the like.

Further, although the sealing device is illustrated to have a structure for closing the tubular clearance T formed in an overlapping part of the outer tube 1 as the tube member and the inner tube 2 as the axial member in the above embodiment, there is no limitation to this. The sealing device may be structured to close between a cylinder as a tube member and a piston rod as an axial member inserted into the cylinder.

Further, although the scraper 4 which is arranged between the dust seal 3 and the oil seal 5 is movable following the inner tube (axial member) 2 in the above embodiment, the scraper 4 may be fixed to the outer tube (tubular member) 1 side. In this case, it is not necessary to form the groove 5*a* on the outer side surface 50*b* of the oil seal 5.

Further, if the interference of the scraper 4 and the oil seal lip 51 can be avoided when the scraper 4 moves following the inner tube 2, a configuration other than the groove 5*a* and the stopper 40*b* may be adopted.

Further, the materials for forming the dust seal 3, the oil seal 5 and the scraper 4 are not limited to the above ones and appropriate materials can be selected so that the hardness of the lip portion 41 of the scraper 4 is set to be higher than that of the dust seal lip 31 of the dust seal 3. Further, the shapes of the lip portion 41 and the scraper main body 40 of the scraper 4 can also be appropriately selected.

Further, although the volume of the space A is increased to ensure the space for storing foreign substances by providing the annular groove 10 with the outer tube 1 in the above embodiment, the outer tube 1 may be provided with a discharge path allowing communication between the space A and the outer side (atmosphere side) and foreign substances in the space A may be discharged via this discharge path.

The present application claims a priority based on Japanese Patent Application No. 2011-236574 filed with the Japan Patent Office on Oct. 28, 2011, all the contents of which are hereby incorporated by reference.

The invention claimed is:

1. A sealing device adapted to seal between a tube member and an axial member movably inserted into the tube member, the sealing device comprising:
   a dust seal held on an opening end part of the tube member and including an annular dust seal lip held in sliding contact with the outer peripheral surface of the axial member;
   a scraper arranged at an inner side of the dust seal and including an annular lip portion slidably pressed into contact with the outer peripheral surface of the axial member;
   a clearance formed on the outer periphery of the scraper;
   an oil seal held at an inner side of the scraper on the opening end part of the tube member and including an annular oil seal lip held in sliding contact with the outer peripheral surface of the axial member; and
   a space formed between the oil seal and the dust seal and communicating with the clearance, wherein
   the hardness of the lip portion is higher than that of the dust seal lip,
   the scraper is movable following the axial member between the dust seal and the oil seal, and
   the scraper is movable following the axial member from a first position where the scraper is in contact with the dust seal to a second position where the scraper is in contact with the oil seal.

2. The sealing device according to claim 1, wherein the scraper includes:
   an annular scraper main body,
   the lip portion continuously connected to the inner periphery of the scraper main body and inclined toward an outer side of the oil seal, and
   a stopper projecting toward an inner side of the dust seal from the scraper main body, and the stopper is contactable with a groove formed on an outer side surface of the oil seal.

3. The sealing device according to claim 2, wherein
an outer side surface and an inner peripheral surface of the lip portion intersect at an acute angle on an inner peripheral end of the lip portion as an apex, and
an angle formed between the outer side surface of the lip portion and the outer peripheral surface of the axial member is larger than an angle formed between the inner peripheral surface of the lip portion and the outer peripheral surface of the axial member.

4. The sealing device according to claim 1, wherein the scraper is made of polytetrafluoroethylene.

5. A suspension device with the sealing device according to claim 1, comprising:
an outer tube; and
an inner tube movably inserted into the outer tube,
wherein the suspension device is telescopic and suppresses expansion and contraction movements, and the outer tube is the tube member and the inner tube is the axial member.

6. The sealing device according to claim 1, wherein
the scraper is one member and the oil seal is another member.

* * * * *